United States Patent [19]
Bowlsby

[11] Patent Number: 4,534,316
[45] Date of Patent: Aug. 13, 1985

[54] CAT TOY

[76] Inventor: David B. Bowlsby, 533 W. State St., Ithaca, N.Y. 14850

[21] Appl. No.: 611,203

[22] Filed: May 17, 1984

[51] Int. Cl.³ .............................................. A01K 29/00
[52] U.S. Cl. ....................................................... 119/29
[58] Field of Search .................. 119/1, 29; 273/176 H

[56] References Cited
U.S. PATENT DOCUMENTS

| | | | |
|---|---|---|---|
| 2,894,487 | 7/1959 | Goldson | 119/1 |
| 3,482,548 | 12/1969 | Burns | 119/29 |
| 3,690,673 | 9/1972 | Occhipinti | 273/176 H |
| 3,892,412 | 7/1975 | Koo | 273/176 H |

Primary Examiner—Hugh R. Chamblee
Attorney, Agent, or Firm—Barnard & Brown

[57] ABSTRACT

A toy for pets, especially cats, in the form of a blanket-like material with selectively expansible "risers" operated remotely by a pet owner.

10 Claims, 6 Drawing Figures

CAT TOY

BACKGROUND OF THE INVENTION

The invention pertains to training devices and toys for domestic pets, especially cats.

It is well known that many domestic pets love to play with toys. Cats and kittens, in particular, because of their strongly developed hunting instincts, will spend hours playing with small objects. Kittens are especially fascinated by moving things, especially if they are hidden, and can be pounced upon. It is an object of the invention to provide a toy which is attractive to cats.

Cat owners enjoy playing with their pets, but, unlike dogs, which enjoy retrieving toys, cats tend to be solitary players. Most prior art cat toys are limited in the extent to which the owner may participate. It is a further object of the invention to provide a cat toy which permits the cat owner to participate in the play.

U.S. Pat. No. 4,327,668 issued to Phillips, shows a toy for cats comprising figures of mice moved in slots by rods from underneath a rigid board. This arrangement is awkward for the user, who must place his hands under the baseboard, presumably on the floor. The cat will most likely quickly discern the relationship between hands and models and lose interest. The rigid nature of the assembly limits where it may be played, and requires a large storage area.

It is therefore a further object of the invention to provide a toy for cats and cat owners which is easy and comfortable for the owner, mysterious enough to maintain the cat's interest, and which will store easily when not in use.

SUMMARY OF THE INVENTION

The invention provides a device for playing with pets, especially cats, in which a "blanket" of flexible material has a plurality of remotely operated "riser" to attract and hold the pet's attention. The risers may be actuated by pneumatic or electric means, and each riser may be selectively operated by the user. The blanket is placed in a convenient spot for the cat, and the user operates the risers from a remote location comfortable for him.

DESCRIPTION OF THE PREFERRED EMBODIMENT

Figure 1:
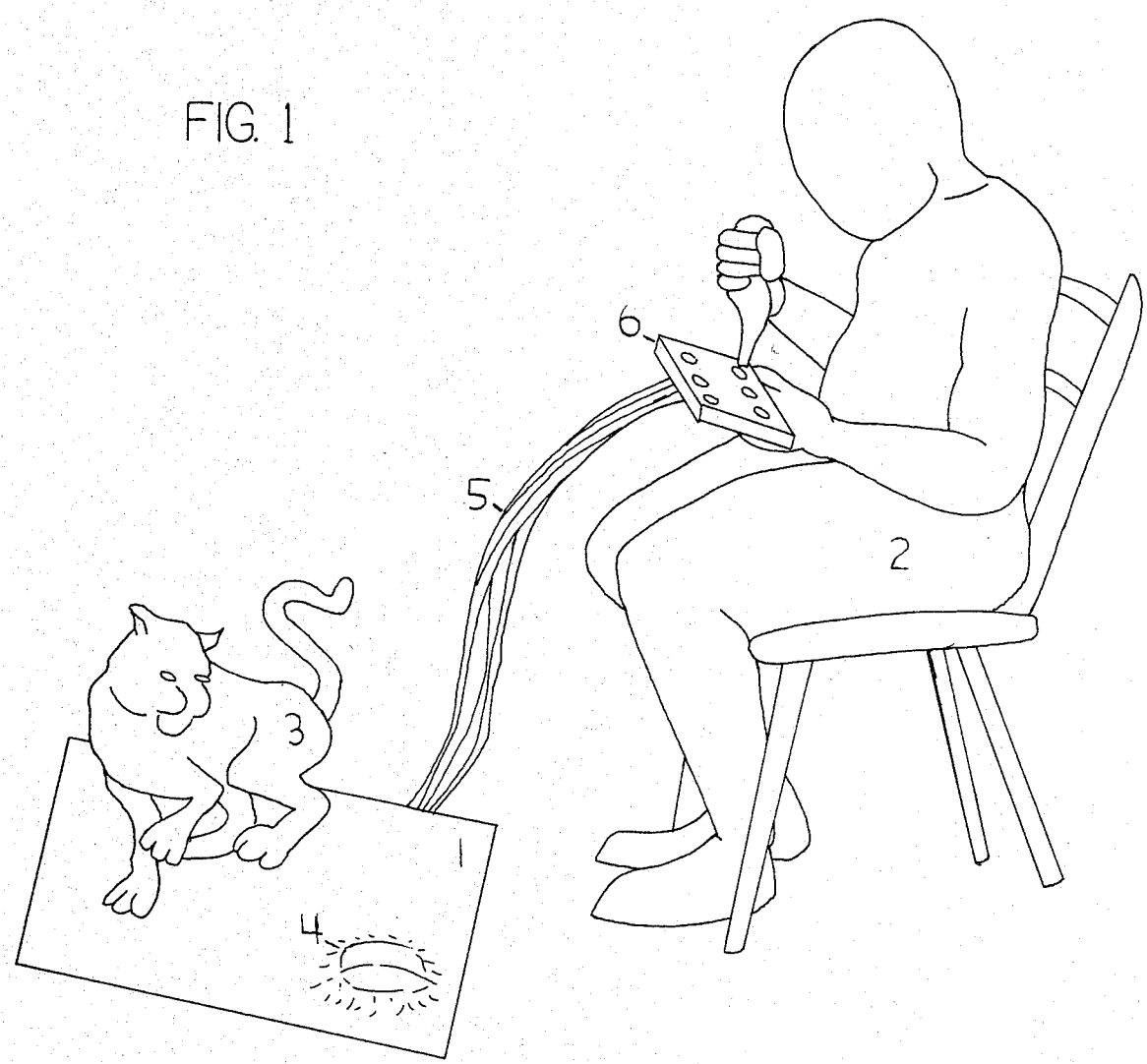
FIG. 1 shows the invention in use.

FIG. 1 shows the invention in use. The blanket (1) is spread on a convenient surface, such as a floor or couch. The pet owner (2) sits in a comfortable position remote from the toy, and holds a control box (6) attached by appropriate leads (5) to the blanket (1). By manipulating the controls (6) the blanket is caused to bulge (4) by means of hidden risers, which attracts the cat (3). By alternately actuating each of a plurality of risers located across the blanket, the cat is enticed into playing with the toy, trying to pounce upon the mysterious "prey" under the blanket.

Figure 2:
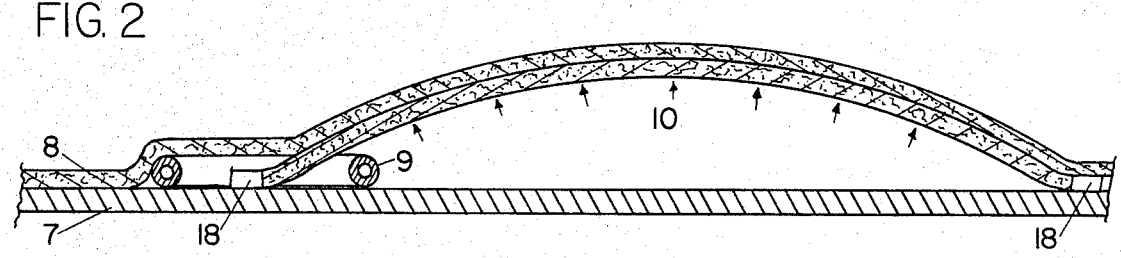
FIG. 2 shows a detail of one "riser" as used in the preferred embodiment.

Preferably, the blanket is made of a relatively heavy, but flexible, base material (7), to hold it in place as the cat runs about, and a lighter cover (8) material which is bulged by the risers between the base and the cover. FIG. 2 shows a cut-away view of one possible riser arrangement. The riser comprises a patch of air-tight stretchable material (10) attached to the base (7) around its periphery (18). A tube (9) routes air to the riser, causing the stretchable material to expand.

Alternatively, the stretchable material might form both top and bottom of the riser in a "pillow" arrangement, or the riser could be formed into the base material itself. As another alternative, an accordion (FIG. 5) arrangement of alternating ribs (17) and constrictions (16) could be used, allowing a relatively tall bulge to fold down relatively flat. As yet another alternative, (FIG. 6) at some increase in expense and penalty in portability, electric solenoids 20 could replace the pneumatic risers, with wires (19) replacing tube (9).

Figure 3:
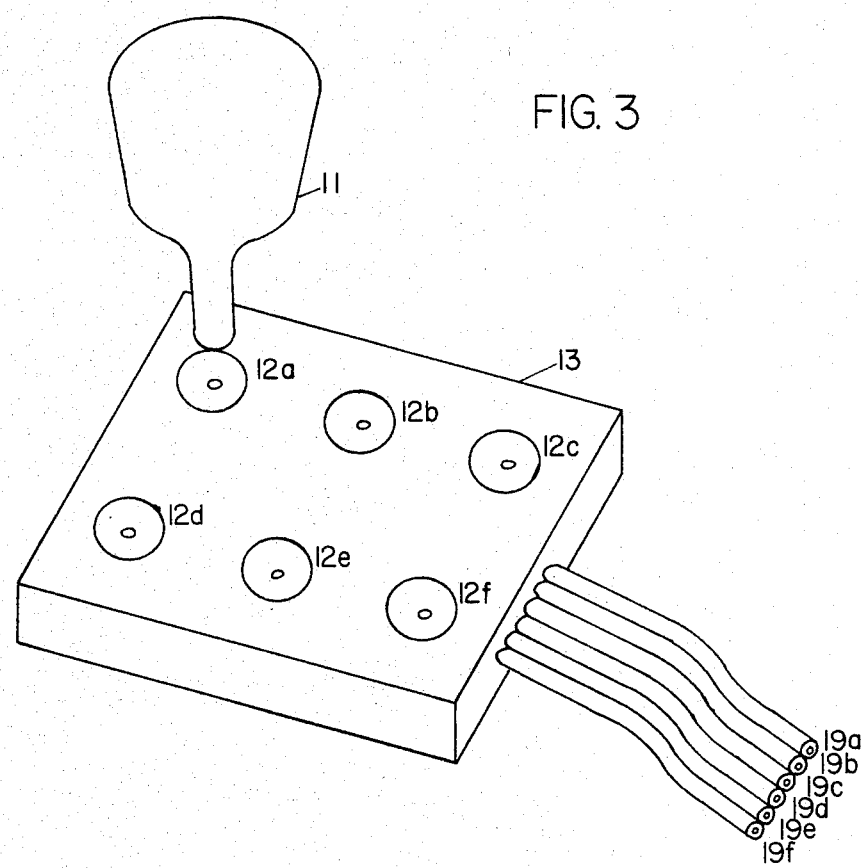
FIG. 3 shows a detail of a control box for the invention.
Figure 4:
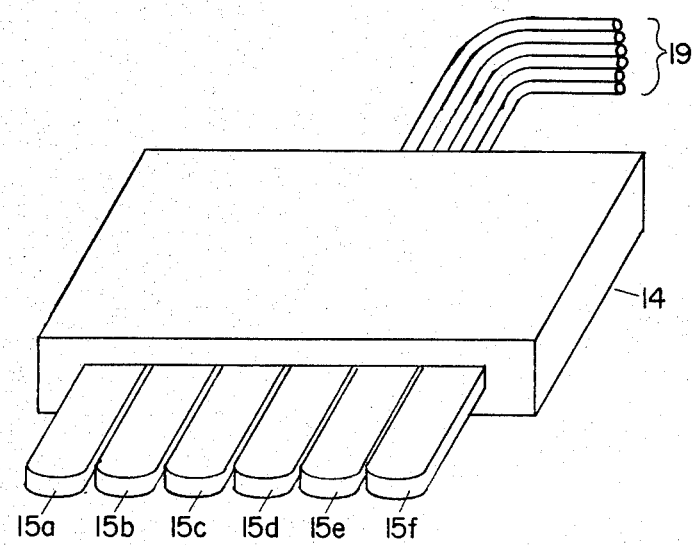
FIG. 4 shows an alternative control box.

FIG. 3 shows a simple control box which could be used with the invention. A box or board (13) is provided with a pluality of holes (12a)-(12f), one for each riser. A tube (19a)-(19f) leads from each hole to its associated riser in the blanket. A squeeze bulb (11) is inserted into the hole corresponding to the riser to be actuated (here (12a)), and squeezed, forcing air through the tube (19a) to inflate the riser. FIG. 4 shows an alternative, more complex, control box using an accordion-like keyboard, with one key (15a)-(15f) per riser.

A further refinement of the invention could add a noise-making element to the game to further intrigue the cat. The noise could be produced in response to the inflation of one or more of the risers, or could be triggered by the cat's actions in pouncing upon the riser, or a combination of the two. A mouse-like squeak or scratching noise would be attractive for cats.

Figure 5:
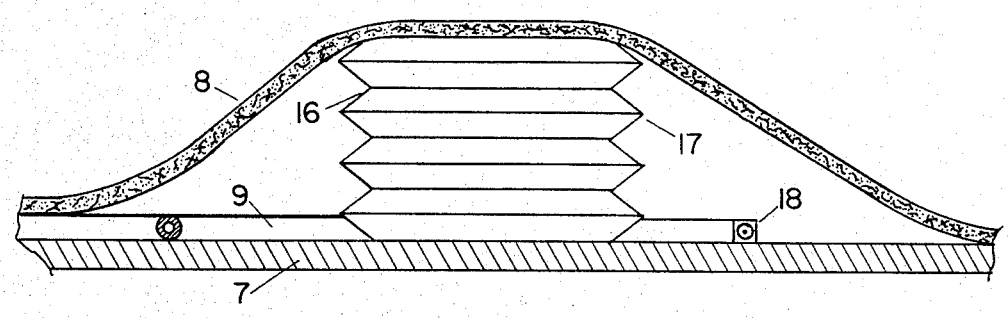
FIG. 5 shows an alternative riser design.
Figure 6:
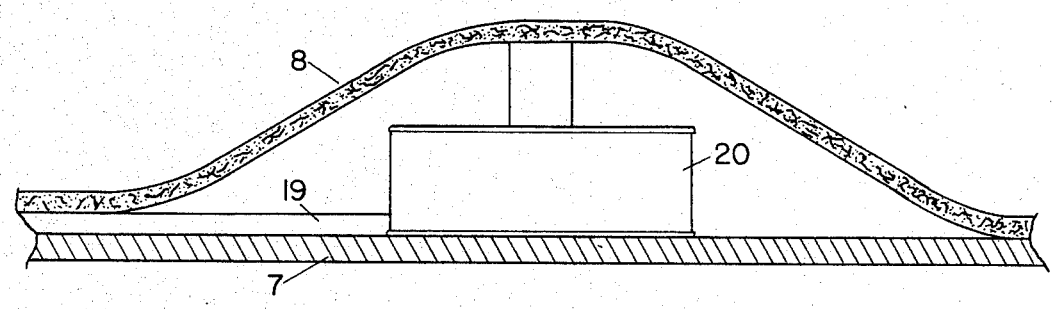
FIG. 6 shows an alternate riser using an electric solenoid.

As shown in FIG. 5, a common "squeaker" (18), as used in many animal's or children's toys, could be added to the riser to make the noise. The "squeaker" (18) shown in FIG. 5 would sound in response to the inflation of the riser or in response to the forceable deflation of the riser by being pounced upon by the cat.

In order to prevent damage to the risers from claws or teeth, the cover may be made of thick material. Alternatively, it could be thickened or reinforced over the risers.

Accordingly, it is to be understood that the embodiments of the invention herein described are merely illustrative of the application of the principles of the invention. Reference herein to details of the illustrated embodiments are not intended to limit the scope of the claims which themselves recite those features regarded as essential to the invention.

I claim:
1. A toy for cats, comprising:
    a. blanket means of dimensions whereby an animal may walk on the same, comprising:
        1. flexible base means made of durable material;
        2. flexible cover means adhered to substantially all of one surface of the base means;
    b. a plurality of riser means, spaced apart and located between the base and cover means, for selectively separating the base and cover means at a plurality of points over the area of the blanket means, whereby the blanket means may be made to bulge at said points by the introduction of air into the riser means;

c. a plurality of conduit means in air-flow communication with each of the plurality of riser means, whereby introduction of air into one of the conduit means will inflate the riser means in communication therewith;

d. remote control means for selectively inflating one or more risers, comprising air induction means in air-flow communication with one or more of the conduit means.

2. The toy of claim 1 wherein the riser means comprise resiliant, sealed enclosures having at least one wall which may be deformed by the introduction of air under pressure.

3. The toy of claim 2 in which the base means and cover means are, at least in the area of the riser means, air impermeable, and the riser means is formed as part of the blanket means.

4. The toy of claim 1 further comprising means for protecting the riser means from damage from claws or teeth of the pet.

5. The toy of claim 4 in which the means for protecting the riser means comprises providing the cover means with puncture-resistant thickening means at least adjacent to the riser means.

6. The toy of claim 1 further comprising means for making a noise in response to the use of the toy.

7. The toy of claim 6 in which the noise-making means is caused to make a noise in response to actuation of at least one of the riser means.

8. The toy of claim 7 in which the noise is a squeak.

9. The toy of claim 6 in which the noise-making means is caused to make a noise in response to the pet's contacting the noise-making means.

10. A toy for cats, comprising:
a. blanket means of dimensions whereby an animal may walk over same, comprising:
 1. flexible base means made of durable material;
 2. flexible cover means adhered to substantially all of one surface of the base means;
b. a plurality of riser means, comprising electrical solenoids spaced apart and located between the base means and the cover means at a plurality of points over the area of the blanket means, whereby activation of the electrical solenoid will cause the blanket means to bulge at said points;
c. wire means for conducting electricity to each of the riser means, electrically communicating with each of the riser means;
d. control means for supplying electricity, electrically communicating with the wire means, whereby one or more of the risers may be actuated.

* * * * *